Jan. 28, 1969 W. M. HODDINOTT 3,424,028
SAFETY HANDLE FOR FEED SCREW OPERATING MECHANISM
Filed March 4, 1966
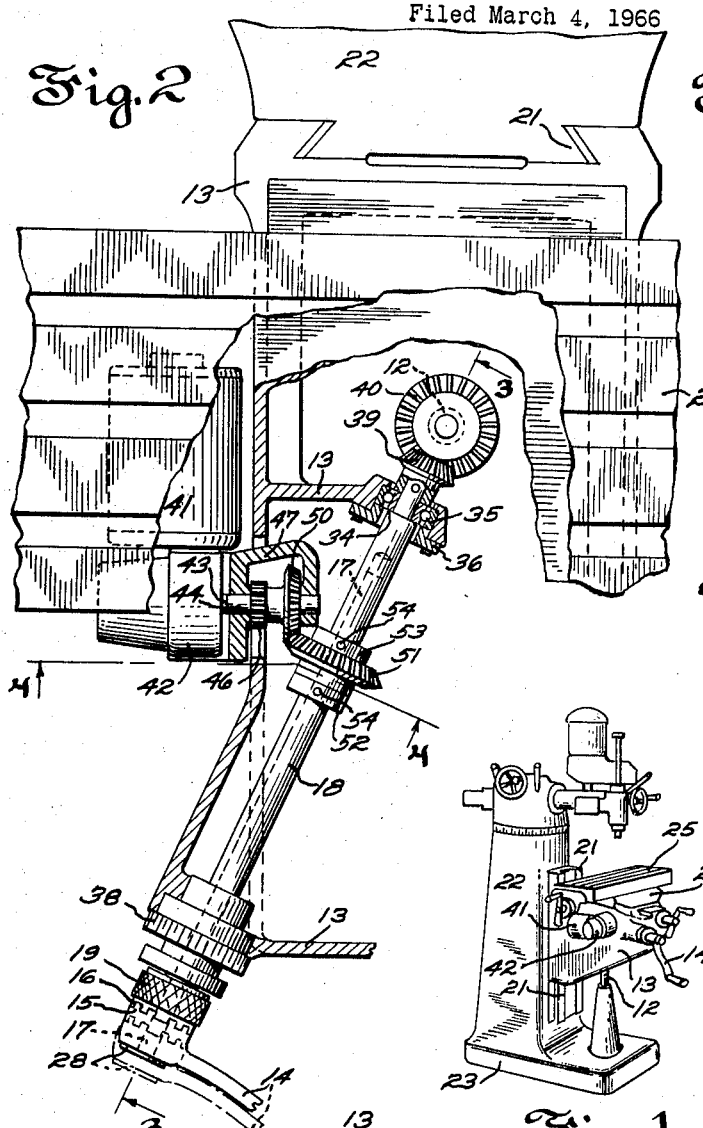
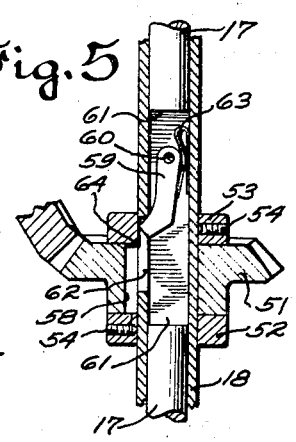
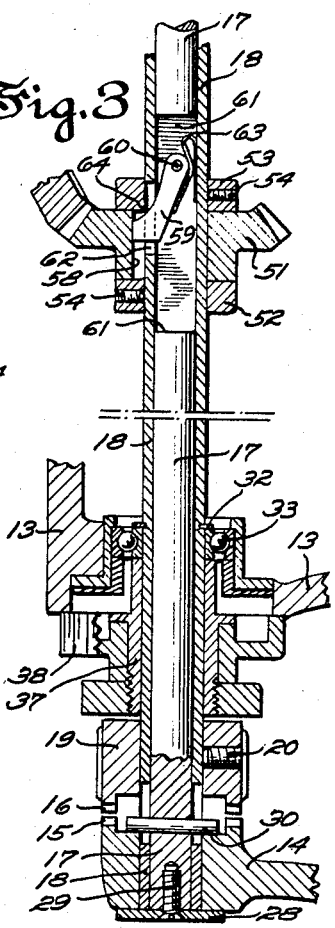
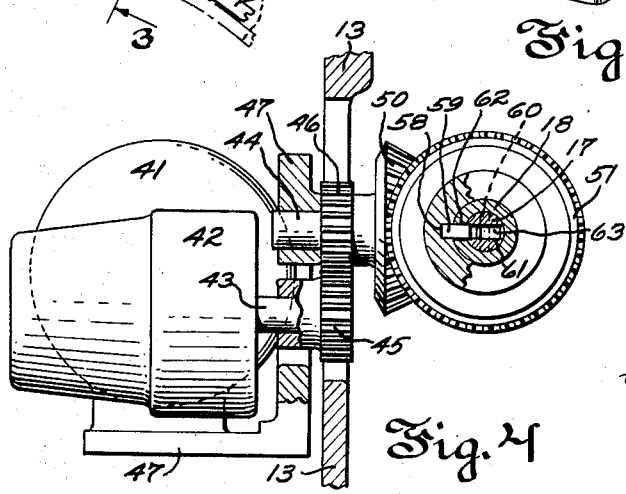
INVENTOR
William M. Hoddinott
BY
ATTORNEY.

United States Patent Office 3,424,028
Patented Jan. 28, 1969

3,424,028
SAFETY HANDLE FOR FEED SCREW OPERATING MECHANISM
William M. Hoddinott, Milford, Conn., assignor, by mesne assignments, to Textron Inc., Providence, R.I., a corporation of Delaware
Filed Mar. 4, 1966, Ser. No. 531,811
U.S. Cl. 74—625                  6 Claims
Int. Cl. F16h *35/00;* B23b *9/00*

ABSTRACT OF THE DISCLOSURE

Mechanism including a hollow shaft and a core shaft slidable lengthwise thereof whereby the feed screw of a movable work support in a milling machine can be rotated optionally by a crank handle or by a source of power. Thrust means prevent axial movement of the core shaft relative to the crank handle wherefore through clutch means that are reversible by sliding of the core shaft the impelling of the feed screw can be transferred back and forth between the crank handle and the source of power by axially shifting the crank handle that can rotate the feed screw.

---

This invention relates to mechanism for operating optionally by hand or by power a feed screw in a milling machine or other machine tool where for safety against injury to the operator it is desired to avoid power drive of a crank wheel or other operating handle.

It is a particular object of the present improvements to enable a single operating handle to be used for the double purpose of turning the feed screw by hand and for transferring the drive of the feed screw from manual to power driven operation.

Another object is to preclude under all circumstances any turning of the operating handle by the source of power by which the feed screw may be driven.

Still another object is to devise and employ a mechanism so constructed that it can be incorporated within, say, the hollow work supporting knee of a milling machine in place of the simple manual control mechanism common thereto and with minimum alteration of the structure of the knee or other parts of a conventional milling machine.

These and other objects of the invention will appear in fuller particular in the following description of a successful embodiment of the invention having reference to the appended drawings, wherein:

FIG. 1 is a perspective view of a turret milling machine showing the knee and its elevating feed screw together with the screw operating crank handle as incorporated in the present improvements.

FIG. 2 is a fragmentary plan view of the work table of the machine broken away to expose the power drive for the feed screw that is located below the work table in the hollow of the knee. The feed screw turning handle is shown clutched as when the feed screw is to be manually turned thereby.

FIG. 3 is an enlarged view of the feed screw turning mechanism taken on the plane 3—3 in FIG. 2 looking in the direction of the arrows with the handle declutched when the feed screw is turned by power.

FIG. 4 shows on the same scale as FIG. 3 the power drive for the feed screw viewed in section on the planes 4—4 in FIG. 2 looking in the directions of the arrows.

FIG. 5 is a view like a portion of FIG. 3 showing the feed screw impelling shaft and its operating handle freed from power drive.

Referring to the drawings, it is conventional in milling machines to turn the vertical lift screw 12, which elevates and lowers the knee 13 of the machine, by means of a shaft diagonally disposed in the hollow of the knee. Such shaft usually projects to the outside of a corner of the knee to receive a crank handle 14 as shown in FIG. 1 of the present drawings. Knee 13 is vertically slidable on the ways 21 of the column 22 of the milling machine which rises from its base 23 and also supports in relatively superimposed positions conventional work carrying parts of a milling machine such as a saddle 24 and work table 25.

According to the present improvements the handle 14 when declutched is rotatably loose on a hollow shaft 18 that telescopically receives a core shaft 17. By axial movement handle 14 can be clutched or declutched with respect to hollow shaft 18 by a first pair of clutch members comprising teeth 15 on the hub of the handle which face and can mesh with corresponding teeth 16 on a collar 19 fixed on shaft 18 by a set screw 20 near the outer end thereof. Although rotatably loose also with respect to core shaft 17, handle 14 is held in fixed axial relation to the latter by confining the hub of the handle axially between an end member 28, that is secured to the end of core shaft 17 by screw 29, and a shoulder affording element in the form of thrust pin 30 that extends diametrically through shaft 17 and projects at each side thereof. Pin 30 extends through and is slidable in axial slots 31 in hollow shaft 18 for permitting telescopic sliding movement between the shafts while preventing relative rotary movement thereof.

The handle 14 then when pulled toward the operator in FIGS. 2 and 3 will shift core shaft 17 lengthwise in the same direction by means of thrust pin 30 while hollow shaft 18 is kept from corresponding axial movement by axial thrust means. The latter thrust means comprise a split snap ring 32 removably lodged in a cross groove in shaft 18 and which engages the inner race of a ball bearing 33, and a shoulder 34 on shaft 18 which engages another ball bearing 35. Both ball bearings 33 and 35 are supported in axially fixed positions in different web walls of the elevatable knee 13. The outer race of bearing 35 is stationed axially by a frame bushing 36. By means of a shouldered sleeve 37 fixed on shaft 18 there is carried an indicator dial 38 peripherally graduated for cooperation with a frame carried index mark 39 to show the rotary position of the composite shaft 17–18.

Shaft 18 has permanently fixed on its opposite or innermost end a bevel pinion 39 that is in constant mesh with another bevel pinion 40 fixed on the shaft of lift screw 12. An electric motor 41 serves as a source of power for turning the lift screw 12 and acts through transmission mechanism to rotate the hollow shaft 18 when motor 41 is electrically energized. Such mechanism, as herein illustrated, comprises speed reduction gearing in a housing 42 that is fixed to the casing of motor 41 and whose output shaft 43 drives a stub shaft 44 through a train of two spur gears 45 and 46. Both of shafts 43 and 44 are journaled in a bracket extension 27 of the gear housing 22 fixedly mounted on knee 13.

Stub shaft 44 also has fixed thereon a bevel gear 50 which is constantly in mesh with a bevel gear 51 that is selectively loose or tight on the aforesaid hollow shaft 18. Two collars 52, 53 on respectively opposite sides of bevel gear 51 serve as positive thrust means to prevent axial movement of bevel gear 51 relatively to shaft 18 and are fixed on the latter by set screws 54.

Bevel gear 51 has a keyway 58 which on different occasions is occupied and vacated by the end of a dog arm 59 acting as a key which keyway and arm serve as a second pair of clutch members. Arm 59 is swingable on a pivot pin 60 within a slot 61 cut diametrically through core shaft 17. Dog arm 59 extends swingingly through an aligned slot 62 in the wall of hollow shaft 18 and can be made to project into keyway 58, being constantly biased to so project by a hairpin shape of leaf spring 63 anchored in the core shaft slot 61. The rise of swingable dog arm 59 into keyway 58 is limited by an annular corner edge 64 of the collar 53. Hence it will be apparent from FIG. 3 that if core shaft 17 is pushed toward the knee relatively to hollow shaft 18 from its position in FIG. 3 to its position in FIG. 5 the dog arm 59 will be carried bodily with it and consequently will be cammed against by collar edge 64 so as to swing downward about pivot 60 until out of keying engagement with the keyway 58 in gear 57. Now the bevel gear 51 becomes free to rotate loosely on shaft 18 and ceases to impart any power drive to the composite shaft 17–18 or to the handle 14.

In operating the feed screw turning parts above described, the crank handle 14 is manually turned in the desired rotary direction as usual while the power delivering gear 51 remains declutched from and turning loosely on the hollow shaft 18 which is permanently geared to the feed screw 12 by bevel pinions 39 and 40.

When it is desired to turn the feed screw 12 by power the same handle 14 together with core shaft 17 and its carried dog arm 59 is manually pulled toward the operator. This first separates the clutch teeth 15, 16 and then causes the dog arm to enter keyway 58 in the power supply gear 51 so that the feed screw 12 alone, and not handle 14, will be rotated under power. Then shoving the handle 14 away from the operator toward the machine will restore the parts for turning the feed screw only by hand. The hollow shaft 18 will become unclutched from power gear 51 before the handle 14 becomes clutched to the latter.

Thus control of the optional manual or power turning of the feed screw is centered in and confined to the single handle 14 whereby all need for extraneous means to cause clutching and declutching of shaft 18 is eliminated.

As the principles underlying this disclosure are capable of embodiment in many forms of mechanical detail differing from those herein proposed, the appended claims are directed to and intended to cover such equivalents as would be obvious to workers in the art.

What is claimed is:

1. Feed screw operating mechanism enabling a single crank handle both to impellingly rotate a feed screw and to transfer the impelling of said feed screw from said handle to a source of power, comprising in combination with the source of power, a hollow shaft, gearing drivingly connecting said hollow shaft to said feed screw, a core shaft reciprocable lengthwise within said hollow shaft, a crank handle rotatable loosely about said core shaft, thrust means on said core shaft and on said handle cooperative to maintain said handle in fixed axial relation to said core shaft whereby to reciprocate the latter lengthwise, a first pair of clutch members operatively connecting said hollow shaft with said handle engaged and disengaged by reciprocative movement of said handle in unison with said core shaft and a second pair of clutch members connected respectively with said hollow shaft and said source of power so as to be simultaneously disengaged and engaged respectively by said reciprocative movement of said core shaft.

2. Feed screw operating mechanism as defined in claim 1, in which the said thrust means comprises a shoulder affording element fast to the said core shaft and projecting radially outward past the cylindrical wall of the said hollow shaft in flanking relation to the said handle.

3. Feed screw operating mechanism as defined in claim 2, in which the clutch members of the said first pair are located on opposite axial sides of the said shoulder affording element.

4. Feed screw operating mechanism as defined in claim 3, in which the said first pair of clutch members comprise clutch teeth in fixed axial relation to the said hollow shaft and cooperative clutch teeth carried by the said handle in axially shiftable relation to said hollow shaft.

5. Feed screw operating mechanism as defined in claim 2, in which the said shoulder affording element is a pin fixedly lodged in the said core shaft.

6. Feed screw operating mechanism as defined in claim 5, together with an end member of larger diameter than the said core shaft removably attached to the end thereof, and in which the said handle is axially confined between the said pin and said end member.

References Cited

UNITED STATES PATENTS

| 825,647 | 7/1906 | Hanson | 74—625 XR |
| 1,270,862 | 7/1918 | Parsons | 90—21 |
| 1,959,329 | 5/1934 | Bennett | 90—21 |

FRANCIS S. HUSAR, *Primary Examiner.*

U.S. Cl. X.R.

90—21